United States Patent Office 3,068,292
Patented Dec. 11, 1962

3,068,292
OXYGENATED POLYENE ALDEHYDES
Albert J. Reedy and John D. Cawley, Rochester, N.Y., assignors to Eastman Kodak Company, Rochester, N.Y., a corporation of New Jersey
No Drawing. Filed Mar. 23, 1960, Ser. No. 16,950
8 Claims. (Cl. 260—598)

This invention relates to a new class of compounds and more particularly, a new class of compounds useful in the preparation of oxygenated carotenoids.

It is an object of this invention to provide novel oxygenated polyene aldehydes.

It is another object of this invention to provide a new class of oxygen-containing unsaturated aldehydes having the carbon structure of vitamin A.

It is likewise an object of this invention to provide novel oxygenated polyene aldehydes that can be converted to carotenoids useful as additives to poultry feeds to produce pigmentation in poultry fed thereon as well as pigmentation of the yolks of eggs from such poultry.

The novel compounds of the invention are oxygenated or alkoxy polyene aldehydes having the formula $$R-CH=CH-\underset{CH_3}{\overset{|}{C}}=CH-CH=CH-\underset{CH_3}{\overset{|}{C}}=CH-\overset{O}{\overset{\|}{C}}H$$

wherein R is an alkoxy-substituted ionyl ring, and typically a monovalent radical having the formula

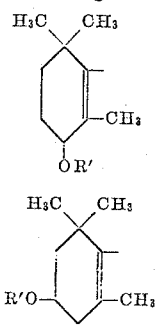

or

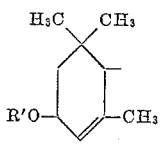

wherein R' is an alkyl radical, usually having 1 to 18 carbon atoms, desirably 1 to 12 carbon atoms and preferably 1 to 4 carbon atoms. Likewise, we contemplate that the various stereo or cis and trans isomeric forms of the described oxygenated polyene aldehydes are within the scope of our invention.

As used herein, the term "ionyl ring" is a monovalent radical having the carbon structure

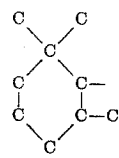

The oxygenated polyene aldehydes of the invention having the alkoxy substituent in the 3-position in the ionyl ring, namely,

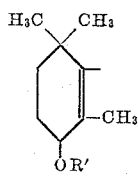

can be prepared by reacting vitamin A aldehyde with N-bromosuccinimide in the presence of an alcohol having the carbon structure of the alkoxy substituent desired. Oxygenated polyene aldehydes of the invention can also be prepared by first reacting α-ionone with dibromoethylmethylhydantoin to brominate the ionyl ring, and thereafter the resulting brominated α-ionone is converted to alkoxy-substituted ionone derivatives by treating with an alcohol having the carbon structure of the alkoxy substituent desired. During the alkoxylation of the α-ionone, a portion of the α-ionone derivative isomerizes to the corresponding β-ionone derivative. Hence, the alkoxylation reaction mixture comprises a mixture of alkoxy-substituted ionones indicated to be 4-alkoxy-β-ionone and 4-alkoxy-α-ionone and assigned the structures of

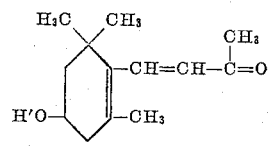

and

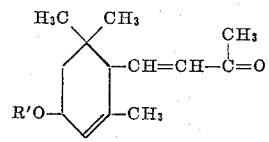

These two isomers can be separated by chromatographic separation, or the mixture can be converted to the subject oxygenated polyene aldehydes and then separated if desired. The 4-alkoxy-β-ionone and/or the 4-alkoxy-α-ionone can be converted to the oxygenated aldehydes of the invention by the general method described in Humphlett and Burness U.S. Patent No. 2,676,990 for preparing vitamin A aldehyde from β-ionone which can be represented by the following series of equations wherein R is a monovalent radical, having the formula

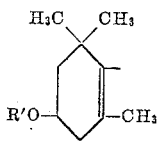

or

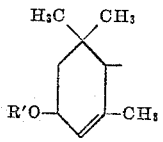

and R' is an alkyl radical:

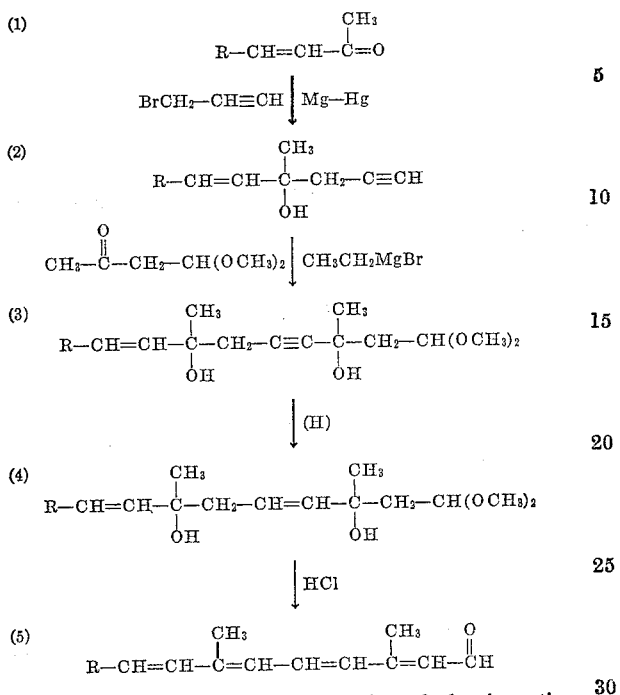

The oxygenated polyene aldehydes of the invention have utility in the preparation of oxygenated carotenoid colorants of the type useful for adding to poultry feeds which contain low levels of natural colorants. Poultry fed on such fortified feeds have a coloration more desirable for merchandising purposes. Likewise, eggs of such poultry have a coloration desired by manufacturers of cake mixes and egg noodles. Such oxygenated carotenoids can be prepared by treating the subject oxygenated polyene aldehydes with phosphorus pentasulfide in an amine solvent medium at an elevated temperature as disclosed in Robeson application U.S. Serial No. 16,951 titled "Synthesis of Oxygenated Carotenoids," filed concurrently herewith. This carotenoid synthesis can be represented as follows:

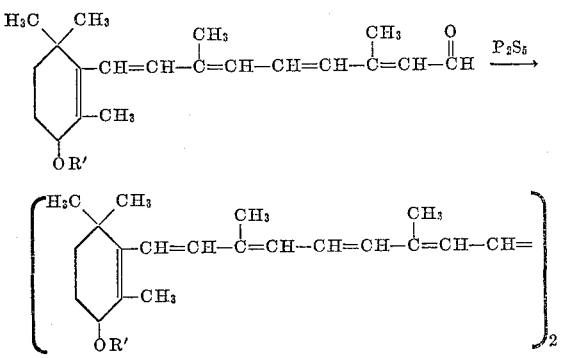

Oxygenated carotenoids can also be prepared by treating the subject oxygenated polyene derivatives with hydrogen sulfide to form a substituted thiapyran by the process described in copending Chechak and Robeson application U.S. Serial No. 798,574, filed March 11, 1959, titled "Substituted Thiapyrans and Their Method of Preparation," and thereafter desulfurating the resulting substituted thiapyran as described in copending Stern application U.S. Serial No. 798,576 filed March 11, 1959, titled "Desulfuration Process for Preparing Symmetrical Unsaturated Hydrocarbons" or Robeson and Chechak application U.S. Serial No. 798,576 filed March 11, 1959, titled "Preparation of β-Carotene." The preparation of oxygenated carotenoids from the subject oxygenated polyene aldehydes by the hydrogen sulfide method can be represented as follows:

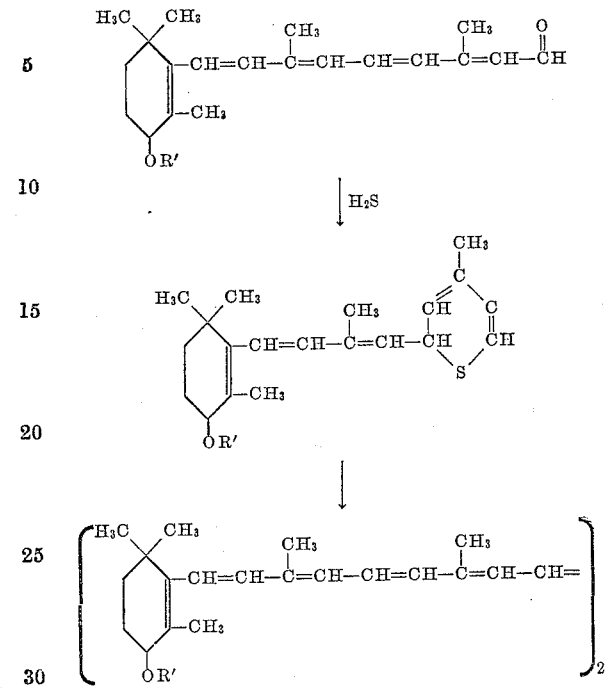

By the described hydrogen sulfide method of preparing oxygenated carotenoids, the novel oxygenated polyene aldehydes gives unexpectedly higher yields of oxygenated carotenoids than other closely related oxygenated polyene aldehydes.

The invention is further illustrated by the following examples of preferred embodiments thereof. The ultraviolet data set out in the following examples were determined in ethanol.

*Example 1*

To a solution of 5 g. of crystalline all-trans vitamin A aldehyde and 2 ml. lauryl alcohol in 30 ml. of chloroform at 0° C. was added a cold (0° C.) solution of 3.15 g. of N-bromosuccinimide and 4 ml. of lauryl alcohol in 150 ml. of chloroform. After 6 minutes, 7.5 g. of N-ethyl morpholine was added to the reaction mixture and the solution allowed to warm to room temperature over a period of 3 hours. After diluting with 100 ml. of diethyl ether, the resulting solution was washed successively with 10% sulfuric acid, 0.5 N potassium hydroxide, and finally with water, and thereafter dried over anhydrous sodium sulfate. The residue obtained after evaporating the solvent was chromatographed on a column of 500 g. of sodium aluminum silicate adsorbent ("Doucil") to give 4.7 g. of a strongly adsorbed fraction of 3-lauroxy-vitamin A aldehyde having E (1%, 1 cm.) (375 mμ)=733. A second similar chromatographing raised the E (1%, 1 cm.) value to 887. The infrared absorption curve of the prepared product showed the presence of the carbonyl and ether groups. The prepared 3-lauroxyvitamin A aldehyde had the formula,

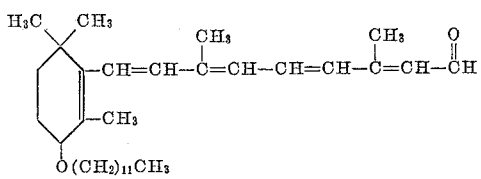

*Example 2*

Five grams of crystalline all-trans vitamin A aldehyde was dissolved in a mixture of 30 ml. chloroform and 2 ml. anhydrous methanol. This solution was cooled to 0° C. and treated with 3.15 g. N-bromosuccinimide in a mixture of 150 ml. of chloroform and 4 ml. of methanol also at 0° C. The solution was allowed to stand at 0° C. for 5 min., and then treated with 7.5 g. of N-ethylmorpholine. The solution was allowed to warm to room temperature over a 3 hr. period, diluted with 300 ml. of diethyl ether and washed successively with cold 10% HCl, 0.5 N KOH and water. The solution was dried with anhydrous sodium sulfate and evaporated. The yield of product was 6.04 g. This material was dissolved in 100 ml. of petroleum ether (boiling 30–60° C.), and chromatographed on 350 g. sodium aluminum silicate adsorbent ("Doucil"). A weakly adsorbed orange zone near the bottom of the column gave, on elution with diethyl ether, 2.0 g. of unreacted vitamin A aldehyde, E (1%, 1 cm.) (378 m$\mu$)=1245. A more strongly adsorbed yellow zone was eluted to give 3.04 g. of 3-methoxyvitamin A aldehyde with E (1%, 1 cm.) (372 m$\mu$)=1194. The prepared 3-methoxyvitamin A aldehyde had the formula,

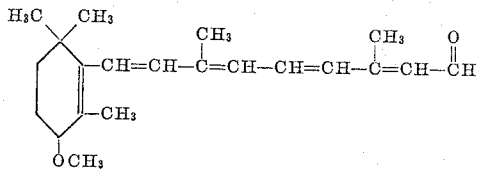

*Example 3*

To 19.2 g. of α-ionone in 140 ml. of carbon tetrachloride was added 18 g. of dibromoethylmethylhydantoin. The mixture was swirled and heated until a vigorous reaction occurred. When the reaction subsided, the mixture was refluxed 2 minutes, rapidly cooled to 15° C., and filtered from the solid ethylmethylhydantoin in the reaction mixture into a solution of 12.3 g. of anhydrous sodium acetate in 125 ml. of methanol. The ethylmethylhydantoin on the filter was washed with 50 ml. carbon tetrachloride, and 50 ml. more of methanol were added to the combined filtrate and washings, which were simmered 2.5 hours and let stand at room temperature overnight (about 18 hours). The resulting reaction product was then worked-up by water dilution and extraction with diethyl ether to give 24.8 g. of an oil which was chromatographed on alumina from petroleum ether (boiling 30–60° C.). The lower zone of the chromatographic column containing unreacted α-ionone was washed through the column and discarded, and the main zone of the chromatographic column eluted to give 18.8 g. of an oil having E (1%, 1 cm.) (225 m$\mu$, 281 m$\mu$)=458, 138 and strong ether and weak acetate ester bands in its infrared spectrum. The resulting product was let stand at room temperature overnight (about 18 hours) in 100 ml. of .5 N potassium hydroxide in 90% ethanol. The resulting 16.7 g. of oil was chromatographed from petroleum ether (boiling 30–60° C.) on a 3.7 x 60 cm. sodium aluminum silicate adsorbent ("Doucil") column. A lower yellow zone was washed through the column, giving 12.2 g. of an orange oil having E (1%, 1 cm.) (223 m$\mu$, 287 m$\mu$)=382, 230. The infrared spectrum of the orange oil showed the presence of a conjugated ketone at 5.95$\mu$, a conjugated double bond at 6.18$\mu$, a methoxy group at 9.11$\mu$, and a trans-double bond at 10.17$\mu$, indicating that the material was composed of methoxyionones. Based on the analysis, the prepared product was indicated to be a mixture of 4-methoxy-α-ionone and 4-methoxy-β-ionone. The resulting methoxyionones were then converted to oxygenated polyene aldehydes of the invention by the general method described in Humphlett and Burness U.S. Patent No. 2,676,990 for preparing vitamin A aldehyde from β-ionone as follows. A 10 g. portion of the prepared methoxyionones was reacted with 58.5 g. of propargyl bromide and 1.2 g. of magnesium turnings in about 35 ml. of diethyl ether.

The reaction was effected by warming to gentle reflux with stirring for about 5 minutes, the heat removed and the reaction controled with an ice bath to a gentle reflux for 30 minutes. Thereafter, heat was applied and the reaction mixture gently refluxed 30 minutes more. The resulting magnesium complex was decomposed with 5% sulfuric acid. The resulting propynyl carbinols were then converted to acetylenic diol acetals by condensing with 7.2 g. of 4,4-dimethoxy-2-butanone in the presence of ethyl-magnesium bromide in about 100 ml. of diethyl ether by refluxing for about 5 hours, and the resulting complex decomposed with 5% sulfuric acid to produce acetylenic diol acetals. The acetylenic diol acetals were purified by chromatographing on a sodium alumina silicate adsorbent ("Doucil"), to yield an 8.2 g. purified fraction which was selectively reduced to olefinic diol acetals with hydrogen over .82 g. of 5% palladium catalyst on carbon in 82 cc. of butanone-2 containing .41 ml. of quinoline. The reduction was effected in about 20 minutes at room temperature. After removal of the hydrogenation catalyst by filtration, the resulting olefinic diol acetals were refluxed in the presence of .62 ml. of quinoline and .72 ml. of hydrochloric acid in about 50 ml. of methyl ethyl ketone. The resulting reaction product was a mixture of oxygenated polyene aldehydes of the invention having E (1%, 1 cm.) (373 m$\mu$)=715 and indicated to have the structures

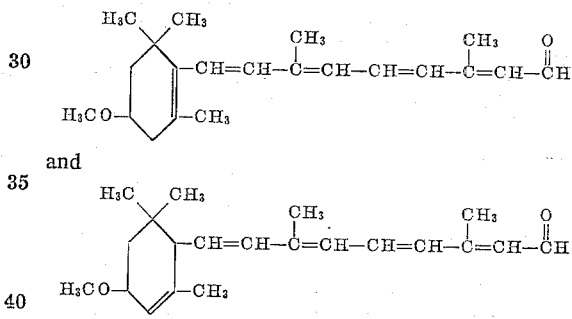

and

These prepared polyene aldheydes can be separated by chromatographing on a sodium aluminum silicate adsorbent.

The oxygenated polyene aldehydes of the invention have utility for preparing carotenoid poultry pigmenting materials as illustrated by Example 4 below.

*Example 4*

To a mixture of 0.99 g. of phosphorus pentasulfide in 10 ml. of pyridine was added a solution of 20 ml. of pyridine containing 1.8 g. of a 3-methoxyvitamin A aldehyde concentrate having E (1%, 1 cm.) (372 m$\mu$)=1088 and 0.3 g. of hydroquinone. The resulting mixture was heated on a steam bath for one hour. An additional 0.99 g. of phosphorus pentasulfide was added and the steam bath heating was continued for another hour. After cooling, the soluble portion of the reaction mixture was taken up in diethyl ether and the ether solution washed successively with 10% sulfuric acid, 0.5 N potassium hydroxide and then with water. The ether solution was then dried over anhydrous sodium sulfate, filtered, and the solvent removed by evaporation to yield 0.74 g. of a 4,4'-dimethoxy-β-carotene concentrate as a glassy red solid having E (1%, 1 cm.) (445 m$\mu$)=410. The oxygenated carotenoid product was further concentrated by chromatographing on a column of aluminum oxide to produce a product having E (1%, 1 cm.) (448 m$\mu$)=660. When the prepared oxygenated carotenoid is employed in a pigment-free chicken feed formulation at a level of about 36 mg. per pound of feed, and fed to chickens ad libitum for one week following a depletion period of 3 weeks on a pigment-free diet, an orange tint is imparted to the skin of the chickens. For merchandizing purposes, it is desirable that poultry have pigmented skin. Lack of natural colorants in many commercial feed mixtures has created the need for such pigmenting materials as can be prepared from the oxygenated polyene aldehydes of the invention.

Thus, the present invention provides a new and useful class of compounds.

Although the invention has been described in detail with particular reference to certain typical embodiments, it will be understood that variations and modifications can be effected within the spirit and scope of the invention as described hereinabove and as defined in the appended claims.

We claim:

1. An oxygenated polyene aldehyde having the formula

wherein R is an alkoxy-substituted ionyl ring having a formula selected from the group consisting of

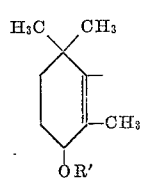 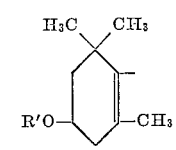 and 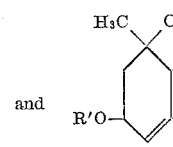

wherein R' is an alkyl radical having 1 to 18 carbon atoms.

2. An oxygenated polyene aldehyde having the formula

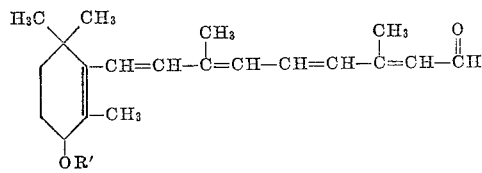

wherein R' is an alkyl radical having 1 to 18 carbon atoms.

3. An oxygenated polyene aldehyde having the formula

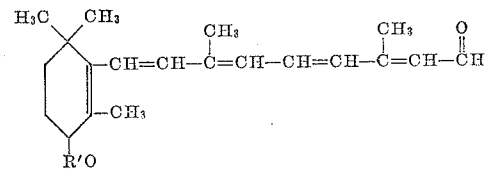

wherein R' is an alkyl radical having 1 to 18 carbon atoms.

4. An oxygenated polyene aldehyde having the formula

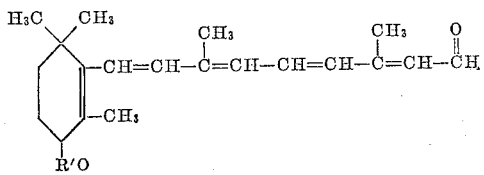

wherein R' is an alkyl radical having 1 to 18 carbon atoms.

5. An oxygenated polyene aldehyde having the formula

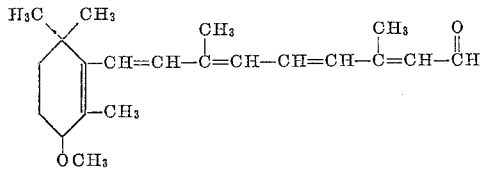

6. An oxygenated polyene aldehyde having the formula

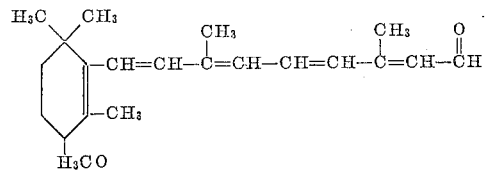

7. An oxygenated polyene aldehyde having the formula

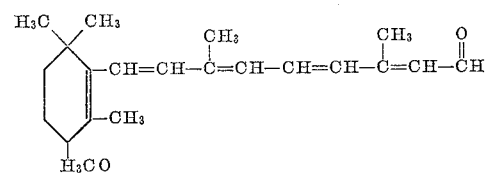

8. An oxygenated polyene aldehyde having the formula

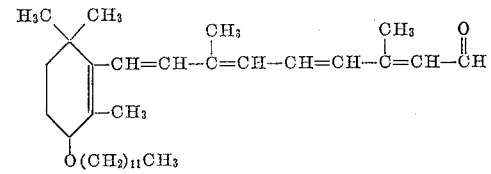

References Cited in the file of this patent

UNITED STATES PATENTS 2,819,298　Isler et al. _____ Jan. 7, 1958

UNITED STATES PATENT OFFICE
CERTIFICATE OF CORRECTION

Patent No. 3,068,292                      December 11, 1962

Albert J. Reedy et al.

It is hereby certified that error appears in the above numbered patent requiring correction and that the said Letters Patent should read as corrected below.

Column 2, lines 26 to 32, the formula should appear as shown below instead of as in the patent:

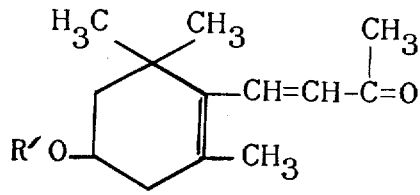

column 7, lines 45 to 51, the formula in "claim 3", should appear as shown below instead of as in the patent:

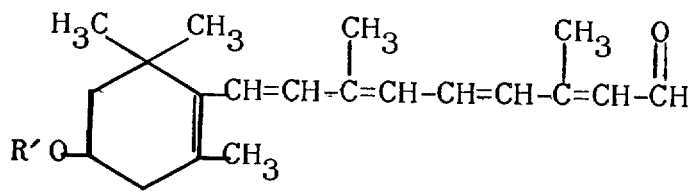

column 8, lines 3 to 9, the formula in "claim 4", should appear as shown below instead of as in the patent:

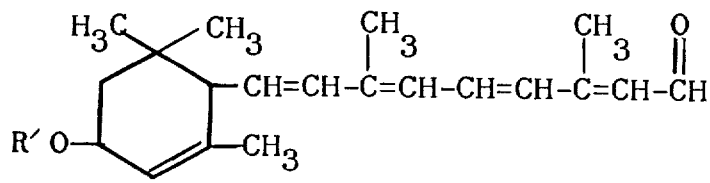

lines 23 to 30, the formula in "claim 6", should appear as shown below instead of as in the patent:

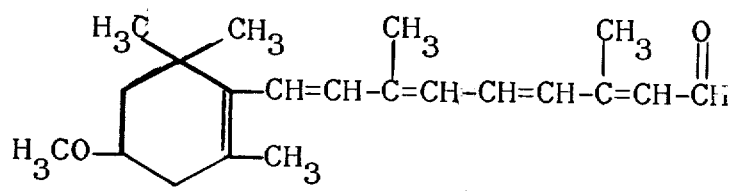

lines 33 to 40, formula in "claim 7", should appear as shown below instead of as in the patent:

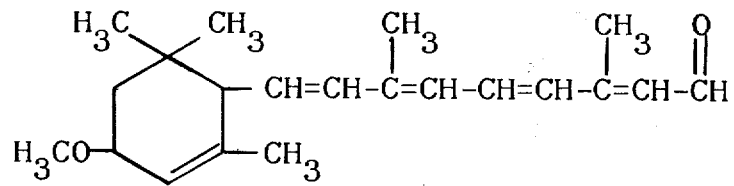

Signed and sealed this 17th day of September 1963.

(SEAL)
Attest:

ERNEST W. SWIDER
Attesting Officer

DAVID L. LADD
Commissioner of Patents